US007240956B2

(12) United States Patent
DeWolfe et al.

(10) Patent No.: US 7,240,956 B2
(45) Date of Patent: Jul. 10, 2007

(54) BEND FLAPS FOR TRIM PANEL MOUNTED WATERSHIELDS

(75) Inventors: Andrew DeWolfe, Clawson, MI (US); Jack L Gray, Rochester Hills, MI (US)

(73) Assignee: Cadillac Products Automotive Company, Troy, MI (US)

( * ) Notice: Subject to any disclaimer, the term of this patent is extended or adjusted under 35 U.S.C. 154(b) by 31 days.

(21) Appl. No.: 11/199,420

(22) Filed: Aug. 8, 2005

(65) Prior Publication Data

US 2007/0029836 A1 Feb. 8, 2007

(51) Int. Cl.
*B60J 10/08* (2006.01)

(52) U.S. Cl. .................................... 296/146.7
(58) Field of Classification Search .............. 296/146.7
See application file for complete search history.

(56) References Cited

U.S. PATENT DOCUMENTS

| 5,095,659 | A | 3/1992 | Benoit et al. |
|---|---|---|---|
| 6,231,944 | B1 | 5/2001 | Holt |
| 6,898,901 | B2 | 5/2005 | Petroski et al. |
| 7,055,887 | B2 * | 6/2006 | Williams et al. ......... 296/146.7 |
| 2002/0170235 | A1 | 11/2002 | Petroski et al. |
| 2003/0001408 | A1 | 1/2003 | Hockenberry et al. |

* cited by examiner

*Primary Examiner*—Dennis H. Pedder
(74) *Attorney, Agent, or Firm*—Harness, Dickey & Pierce, P.L.C.

(57) ABSTRACT

A vehicle moisture barrier comprises a formed barrier film and one or more bend flaps. The bend flaps may be bent along a bend axis formed by a deformation created at a junction line between the bend flap and the barrier film. The distal or free end of the bend flap contacts a trim panel to provide a stiffening force proximate to a raised rib extending from the opposite side of the barrier to promote sealing of the raised rib when a drawn form opposite to the raised rib is not provided to promote such sealing.

22 Claims, 7 Drawing Sheets

BEND FLAPS FOR TRIM PANEL MOUNTED WATERSHIELDS

FIELD OF THE INVENTION

The present invention relates in general to automobile watershields and more specifically to a watershield and method for forming a watershield positioned between a vehicle trim component and vehicle structure.

BACKGROUND OF THE INVENTION

Automobile vehicles commonly provide acoustic barriers between vehicle body members and the interior trim components of the vehicle. In addition to acoustic attenuation, these barriers when used between a door member and a door trim member of an automobile vehicle also provide a seal for moisture and dirt to prevent moisture or dirt from entering into the mechanical component areas of the door structure or contacting the trim panel. In door applications when the barrier is affixed to a door trim member prior to assembly to the door assembly, such barriers are known as trim integrated acoustic shields (TIAS). TIAS barriers are formed of foamed and/or molded polymeric material and/or interpolymer materials and are also commonly provided with a layer of lofting material to improve acoustic attenuation. The lofting material can also be specifically located to promote sealing contact between the barrier and the door member.

Improvements to known acoustic barriers are required, for example, in applications where complex geometry components and a complex seal area are present between a door structure and an interior trim panel. The interpolymer materials currently used in these applications may not provide sufficient porosity control when fabricated in a thermoforming operation. Where thermoformed or permanently formed pockets are desirable, an improved perimeter seal is also desirable in addition to the adhesive bead seal commonly used. U.S. patent application Ser. No. 10/786,906, entitled "Water And Sound Shield Having Raised Sealing Rib", filed Feb. 25, 2004 and commonly owned by the assignee of the present invention, the disclosure of which is incorporated herein by reference, incorporates a raised sealing rib operable without an adhesive bead to seal against specified portions of a vehicle door panel.

The raised sealing rib of U.S. patent application Ser. No. 10/786,906 provides up to a 360 degree water seal. However, the geometry of some applications of vehicle door and trim panels do not provide sufficient contact force throughout the length of the raised sealing rib. Additional, loose pieces of lofting material are commonly added at the time of installation to improve seal contact. This increases the installation costs and does not always effectively position the lofting material where necessary. An improved panel design is therefore desirable to eliminate the need and expense of adding loose lofting material.

SUMMARY OF THE INVENTION

According to one preferred embodiment of the present invention directed to bend flaps for trim panel mounted water shields, a vehicle sound and moisture barrier includes a barrier film. A raised rib operably extends from a first side of the barrier film. A bend flap is positioned proximate to the raised rib having a main wall initially defining a common plane with the barrier film. A deformation is created at a junction line between the bend flap and the barrier film, the deformation defining a bend axis operable to permit bending the bend flap toward a second side of the barrier film and opposite to the raised rib. A distal end of the bend flap following bending defines a contact surface operable to transfer a stiffening force toward the raised rib from the distal end through the main wall.

According to another embodiment, a vehicle sound and moisture barrier further includes a drawn form positioned proximate to a raised rib and extending from a second side of the barrier opposite to the first side. A bend flap is integrally joined to the barrier film and positioned proximate to the raised rib, the bend flap having a main wall initially defining a common plane with the barrier film. A deformation is created at a junction line between the bend flap and the barrier film, the deformation defining a bend axis operable to permit bending the bend flap toward the second side of the barrier film and opposite to the raised rib.

According to still another embodiment of the present invention, a barrier film is disposable between a vehicle door panel and a trim panel. A raised rib operably extending from a first side of the barrier film is oriented toward the door panel. A bend flap is positioned proximate to the raised rib having a main wall initially defining a common plane with the barrier film. A distal end of the bend flap following bending defines a contact surface operable to contact the trim panel and transfer a stiffening force from the trim panel from the distal end through the main wall to promote contact between the raised rib and the door panel.

According to yet still another embodiment of the present invention, a method is disclosed for using a bend flap integrally extending from a water shield to enhance a sealing pressure between a vehicle door panel and a trim panel is provided.

Bend flaps for trim panel mounted water shields of the present invention provide several advantages. For applications where raised forms are impractical, one or more bend flaps of the present invention can locally stiffen the water shield and promote formation of a water resistant seal to a vehicle body member. Bend flaps of the present invention are also applicable when local thickness of a lofting material is insufficient to locally stiffen the water shield. By extending the bend flaps from material of the water shield, additional lofting material or spacer members to stiffen the water shield can be eliminated. The shape and length of bend flaps of the present invention can also be predetermined for each application to maximize localized water shield seal formation while reducing installation time and cost. If the door assembly is subsequently disassembled the bend flaps of the present invention are reusable and are retained with the water shield, reducing lost parts and re-assembly costs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses. The term "shield" used herein generally encompasses the products commercially described as "TIAS", "sound barrier", "sound shield", "water shield" and the like having sound, moisture, air and/or dirt or dust shielding properties, commonly installed in vehicle door assemblies between the door and trim panels. The invention, however, is not limited to applications for only acoustic or water shields and is not limited to installations only between door and trim panels.

Figure 1:
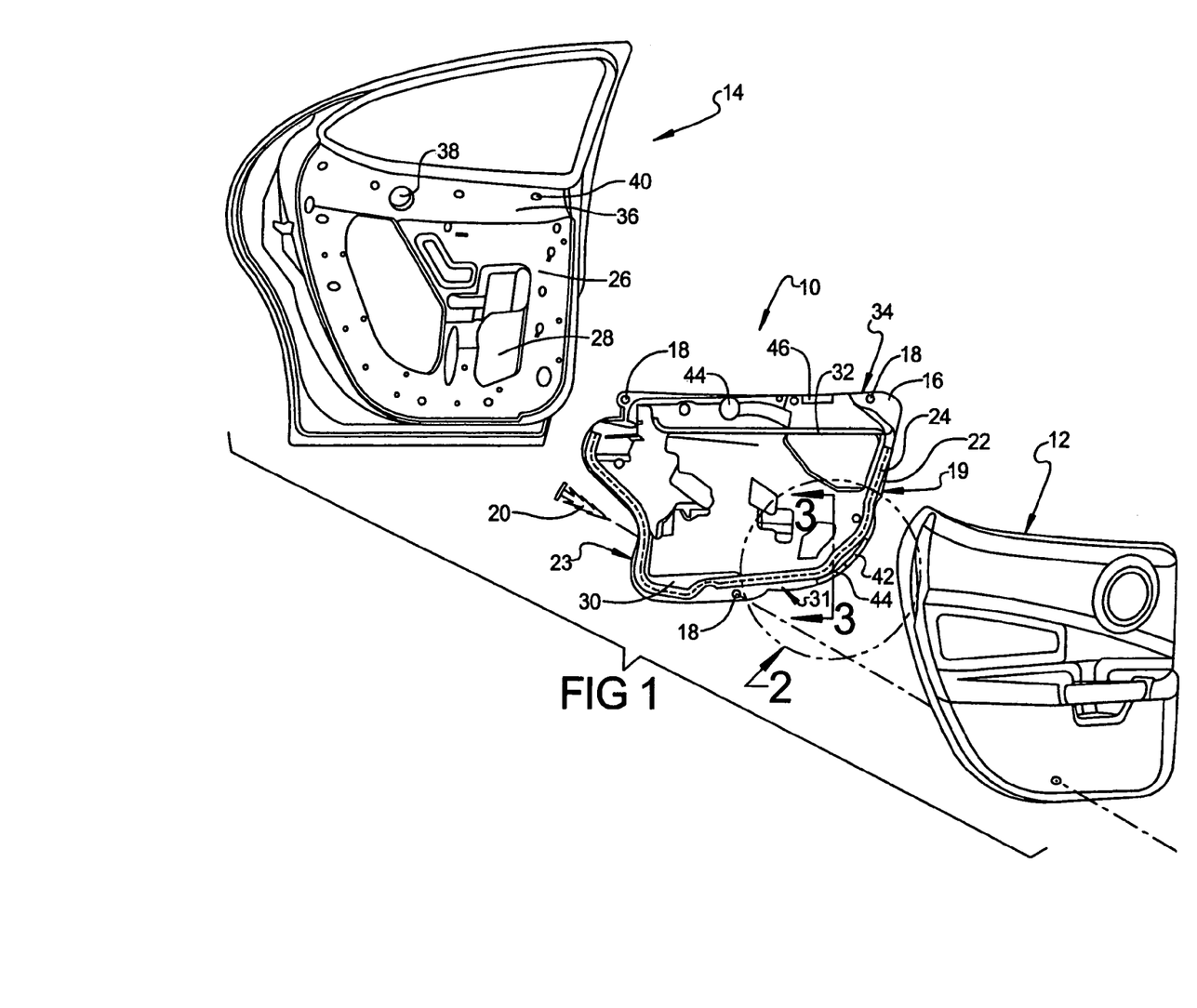
FIG. 1 is a perspective assembly view showing a sound shield of the present invention positioned between a trim panel and a door member according to one preferred embodiment of the present invention.

According to a preferred embodiment of the present invention and as shown in FIG. 1, a shield 10 is positionable between a trim panel 12 and a door member 14 of an automobile vehicle (not shown). Shield 10 includes a barrier film or body 16 having a plurality of apertures 18 formed proximate to a perimeter 19 thereof. Body 16 is mounted to trim panel 12 using a plurality of fasteners 20 which can be either pre-inserted in trim panel 12 or inserted through apertures 18 of shield 10 to engage receiving apertures of trim panel 12. Fasteners 20 are commonly a polymeric "Christmas Tree" type fastener, however a plurality of fastener types can be used. A raised rib 22, defining a sealing surface, is oriented or raised outward from a first side 23 of body 16 facing away from the viewer in FIG. 1 and oriented in a direction facing door member 14. Raised rib 22 is formed about at least a portion of perimeter 19 of shield 10.

Perimeter 19 generally defines a boundary area where moisture as well as dust and/or air can enter the door and trim panel assembly, and therefore a moisture resistant seal is desirable along a substantial portion of perimeter 19 to minimize moisture contact with trim panel 12. In one embodiment, an adhesive bead 24 is positioned on raised rib 22 or on a flat face area proximate to perimeter 19 to promote sealing contact about perimeter 19. Sealing contact is desirable about a substantial length of perimeter 19 and/or along the entire face of raised rib 22 to create a water resistant seal preventing moisture within a sealing area 26 of door member 14 from contacting trim panel 12. The raised rib 22, together with adhesive bead 24 act to adhesively connect shield 10 to door member 14. In another embodiment, no adhesive bead is used, and the seal between the raised rib 22 and sealing area 26 is created by physical contact between raised rib 22 and sealing area 26. In still another embodiment, no raised rib is used and adhesive bead 24 is applied to a flat area of body 16 proximate to perimeter 19 which creates the seal with sealing area 26 by physical contact. Sealing area 26 of door member 14 generally surrounds one or more mechanical/electrical component areas 28. Mechanical/electrical component areas 28 commonly include items such as door locking mechanisms, electric window motors, side view mirror control members and the like (not shown).

Raised rib 22 preferably seals along its entire length and therefore substantially along the entire length of perimeter 19 to sealing area 26. A sealing pressure along raised rib 22 can be reduced by complex geometry of trim panel 12, within or outside of mechanical/electrical component area 28 of door member 14, or a lack of support between fastening locations. To increase the sealing pressure, one or more raised forms 30 are commonly provided on body 16. Raised forms 30 are generally directed toward an opposed, second side 31 of body 16 and are therefore generally oppositely oriented to raised ribs 22. Raised forms 30 contact a proximate surface of trim panel 12. When trim panel 12 and door member 14 are joined, trim panel 12 provides the additional stiffness and mounting pressure against raised rib 22 through raised form 30 to locally increase the sealing pressure along raised rib 22 proximate to raised form 30.

A second raised rib 32, also defining a sealing surface, can be oriented or raised from body 16 outward from first side 23, and facing door member 14, similar to first raised rib 22. Second raised rib 32 is created about a second or internal portion 34 of shield 10. Second portion 34 corresponds to a second area 36 of door member 14 where items such as through service aperture 38 and/or mounting apertures 40 are located. The moisture resistant seal provided by first raised rib 22 and adhesive bead 24 can be eliminated in second sealing area 36. Second raised rib 32 can also act as a moisture deflector.

In locations where raised forms 30 are not practical, shield 10 further includes one or more bend flaps 42, 44, 46. Bend flaps 42, 44, 46 are each integral portions of body 16 and are initially substantially co-planar with body 16. A shape of bend flaps 42, 44, 46 can take any geometric form, such as rectangular, oval, triangular, irregular, and the like. A quantity of bend flaps 42, 44, 46 can vary from one to any number necessary. During installation of shield 10, bend flaps 42, 44, 46 are each bent and directed into a contact position with trim panel 12. Bend flaps 42, 44, 46 function similar to raised forms 30 to locally reinforce shield 10 to improve a sealing pressure where raised rib 22 contacts sealing area 26.

Figure 2:
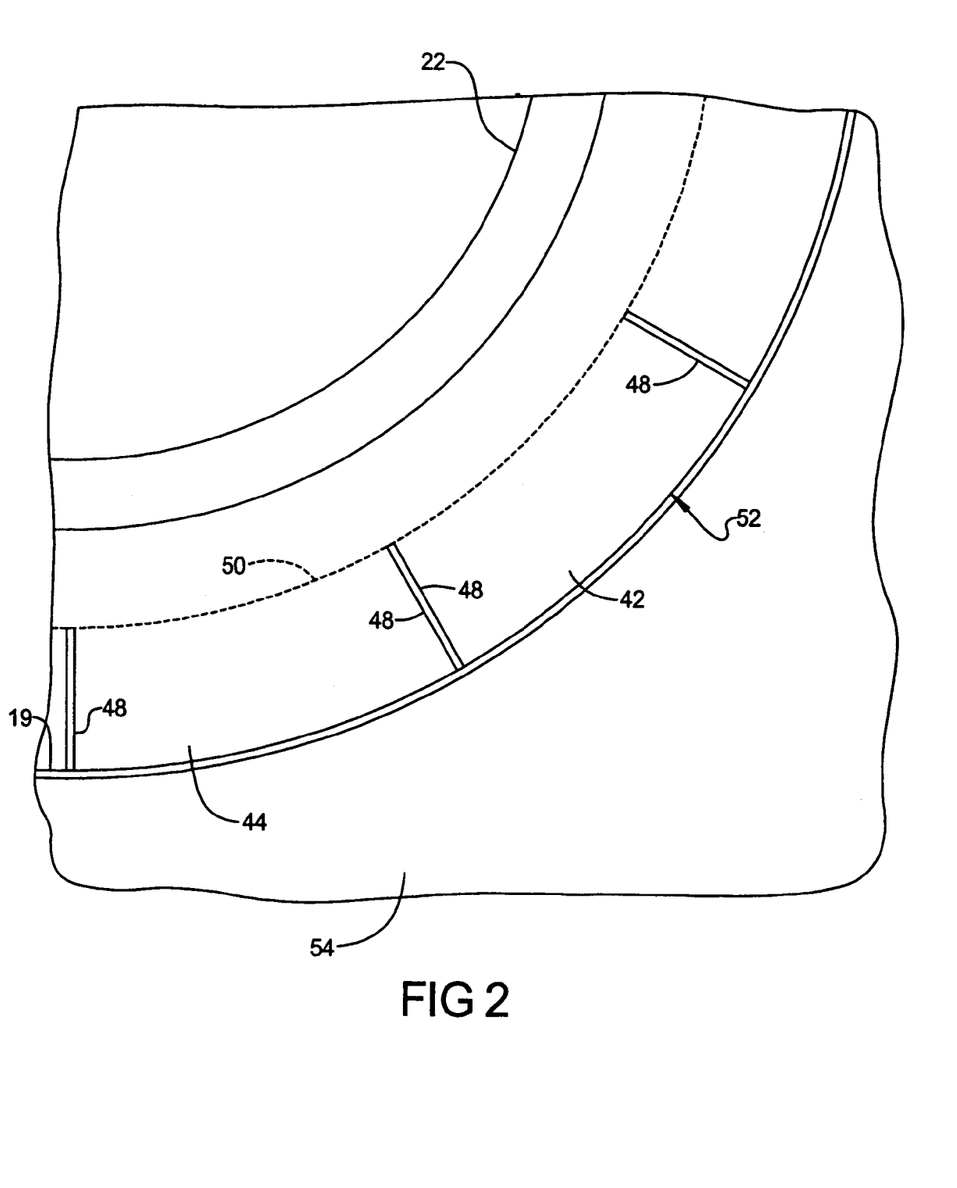
FIG. 2 is an exploded elevation view of area 2 of the sound shield of FIG. 1.

Referring generally to FIG. 2, in one embodiment, bend flaps 42, 44 are created by die cutting a plurality of flap perimeter edges 48 during die cutting of perimeter 19, while retaining an integrally connected junction line 50 for both bend flaps 42 and 44 with body 16. In one preferred embodiment, bend flaps 42, 44 are located along partial perimeter 19 of shield 10 and partially define an outer edge 52 along which water shield 10 is separated (for example by die cutting) and removed from a blank material sheet 54. Shield 10 can also be separated/removed from material sheet 54 by heat cutting, water lancing, or other operations commonly used for this purpose and known in the art. When shield 10 is separated from material sheet 54, bend flaps 42, 44 are substantially co-planar with body 16 of shield 10.

Figure 3:
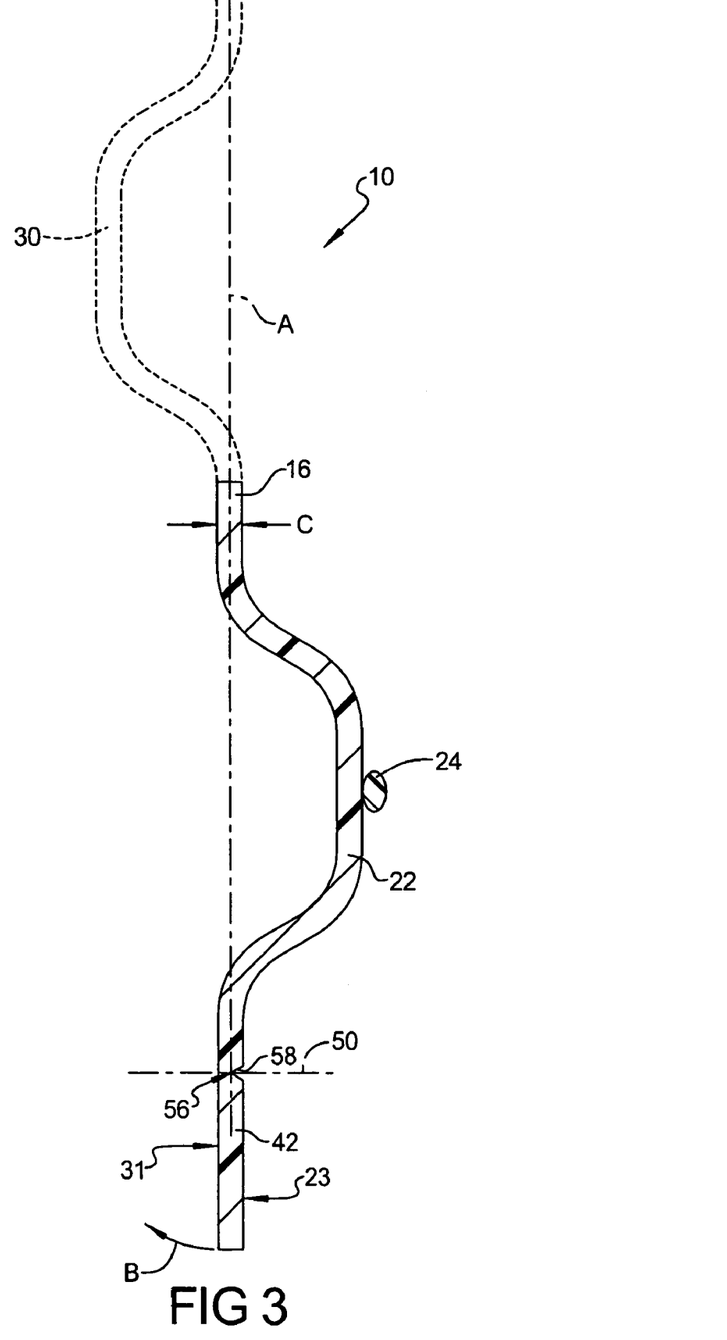
FIG. 3 is a partial cross sectional side elevational view taken at section 3-3 of FIG. 1.

As best seen in Reference to FIG. 3, exemplary bend flap 42 is initially (i.e.: when created and prior to deployment) substantially co-planar with body 16 along a central planar axis "A" defined through body 16. Bend flap 42 is bendable along junction line 50 at a bend axis 56 about an arc of rotation "B". Junction line 50 is defined during or after the die cutting operation when a deformation 58 is created in body 16. Deformation 58 is created for example by dimpling (indenting) along junction line 50 for a portion, for example approximately 50%, of a total thickness "C" of body 16. Dimpling or indentation is preferably used instead of perforations to define junction line 50, because bend flaps of the present invention are not intended to separate from main body 16 and perforations could promote tearing along junction line 50 when the bend flaps are shipped or deployed for use. Dimpling, i.e.; a "living hinge", is preferably performed from first side 23 of body 16 to promote bending toward second side 31. Dimpling can optionally be performed from second side 31. Deformation 58 is preferably simultaneously created when the die cutting operation is performed to form bend flaps 42, 44, 46, but can also be created before or after the die cutting operation.

Figure 4:
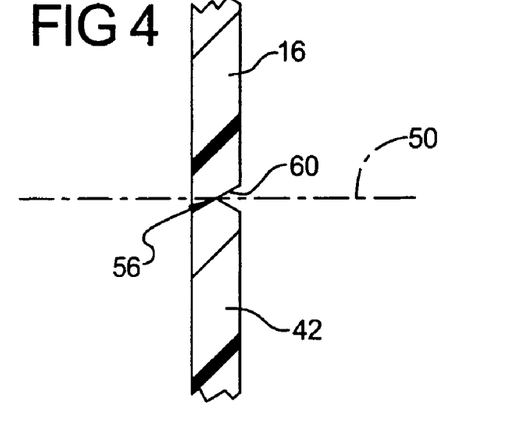
FIG. 4 is a partial cross-sectional side elevational view similar to FIG. 3 of another embodiment of the invention.
Figure 5:
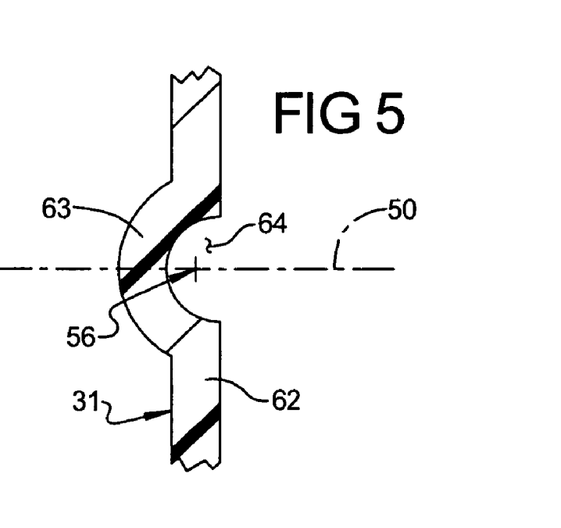
FIG. 5 is a partial cross-sectional side elevational view similar to FIG. 3 of another embodiment of the invention.
Figure 6:
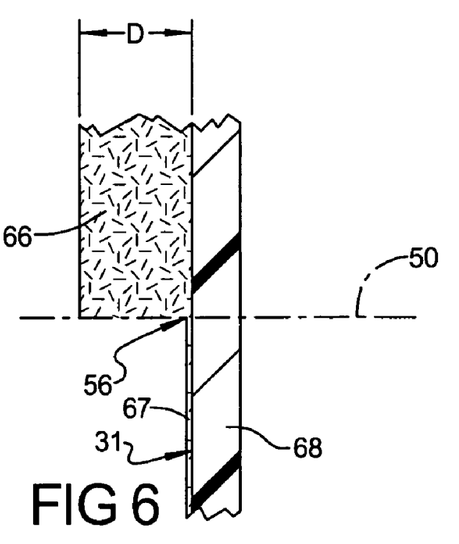
FIG. 6 is a partial cross-sectional side elevational view similar to FIG. 3 of another embodiment of the invention.

Referring generally to FIGS. 4 through 6, in addition to dimpling multiple alternate joint types can be used to induce bending at junction line 50 within the scope of the present invention. Several examples are shown, however it is noted the invention is not limited to these examples. As shown in FIG. 4, junction line 50 is created having a scoring 60 for a portion of a thickness "C" of body 16 similar to the dimpling noted above. Scoring 60 provides a sharper apex at the bottom of deformation 58 compared to dimpling, but is otherwise similar to dimpling to facilitate bending at bend axis 56. As best seen in FIG. 5, a bend flap 62 is created by forming a raised bump 63 toward second side 31 which defines a longitudinal indentation 64 displaced toward second side 31 relative to dimpling. It should be evident that raised bump 63 can also be formed toward first side 23 of body 16. As generally shown in FIG. 6, shield 10 can include a pad or lofting 66 applied to second side 31 having a nominal thickness "D". In this embodiment, lofting 66 includes a crushed or flattened section 67 defining the area of a bend flap 68. Flattened section 67 creates a discontinuity in thickness creating deformation 58 in nominal thickness "D" at junction line 50 thereby defining the location of bend axis 56. Bend flap 68 is then bent along this discontinuity about bend axis 56.

Figure 7:
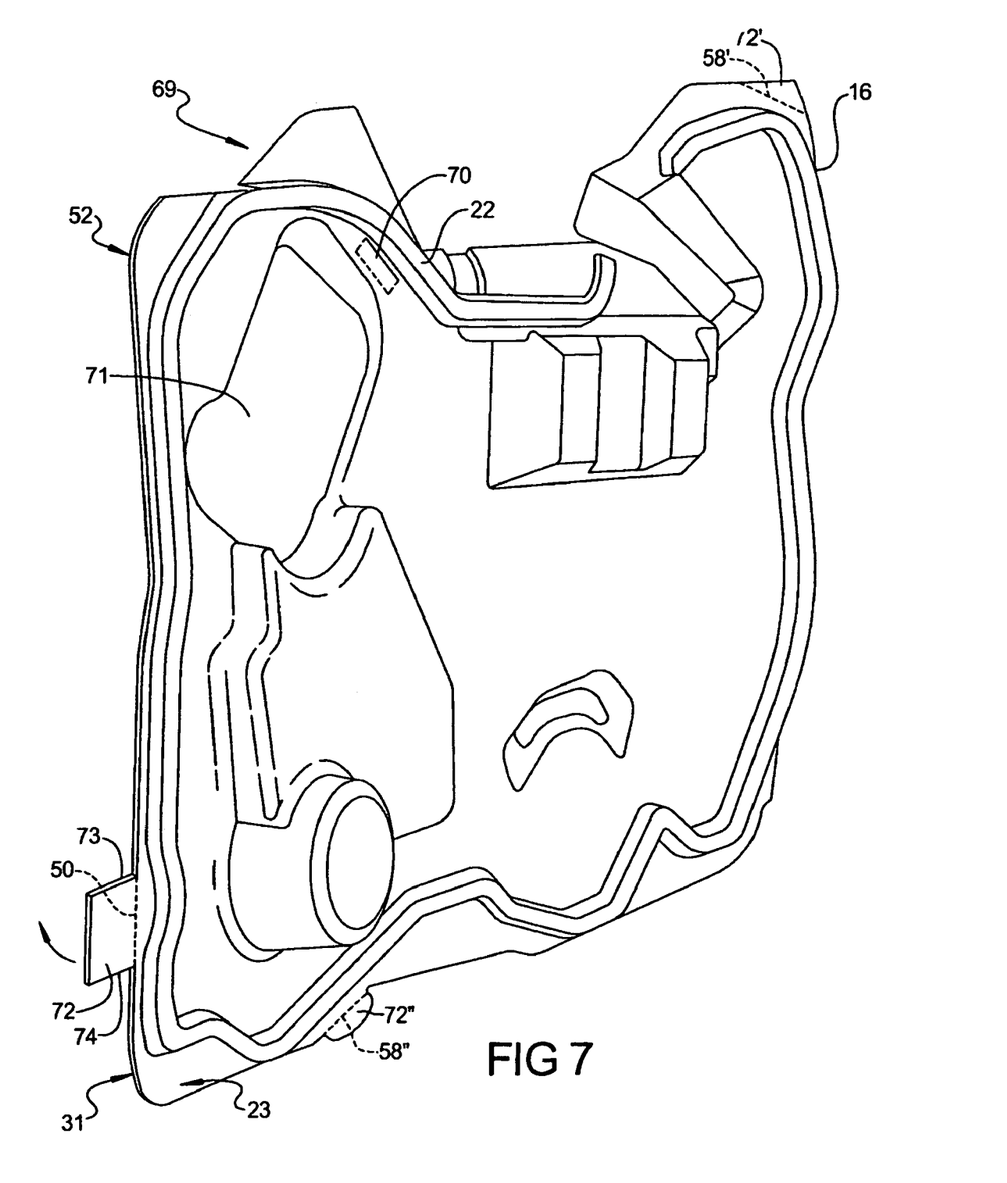
FIG. 7 is a perspective view of another preferred embodiment of a shield of the present invention.

Referring now to FIG. 7, in another embodiment of the present invention a shield 69 is similar to shield 10 and therefore only the differences will be described. One or more internal bend flaps 70 are provided with shield 69. Internal bend flaps 70 are positioned on main body 16 interior of and proximate to raised rib 22. Internal bend flaps 70 are generally used when sufficient material of body 16 is not available outward of raised rib 22. Internal bend flaps 70 can contact raised areas such as raised area 71 to limit a total rotation of internal bend flaps 70. One or more external bend flaps 72 can also be provided. External bend flaps 72, 72', 72" extend outwardly from outer edge 52 and are provided with a deformation 58, 58', 58" similar to the previously noted bend flaps. Deformation 58 for external bend flaps 72 is substantially positioned as a continuation of outer edge 52 to promote bending in line with outer edge 52. Internal and external bend flaps 70 and 72 are also formed for example during a die cutting operation, and are initially substantially co-planar with main body 16. For the substantially rectangular shaped external bend flap 72, one or more free sides 73, 74 are provided. Bend flap 72' is substantially triangular-shaped and bend flap 72" is substantially oval-shaped. The quantity of internal and external bend flaps 70, 72 can also vary, from one up to any quantity required for the application.

Figure 8:
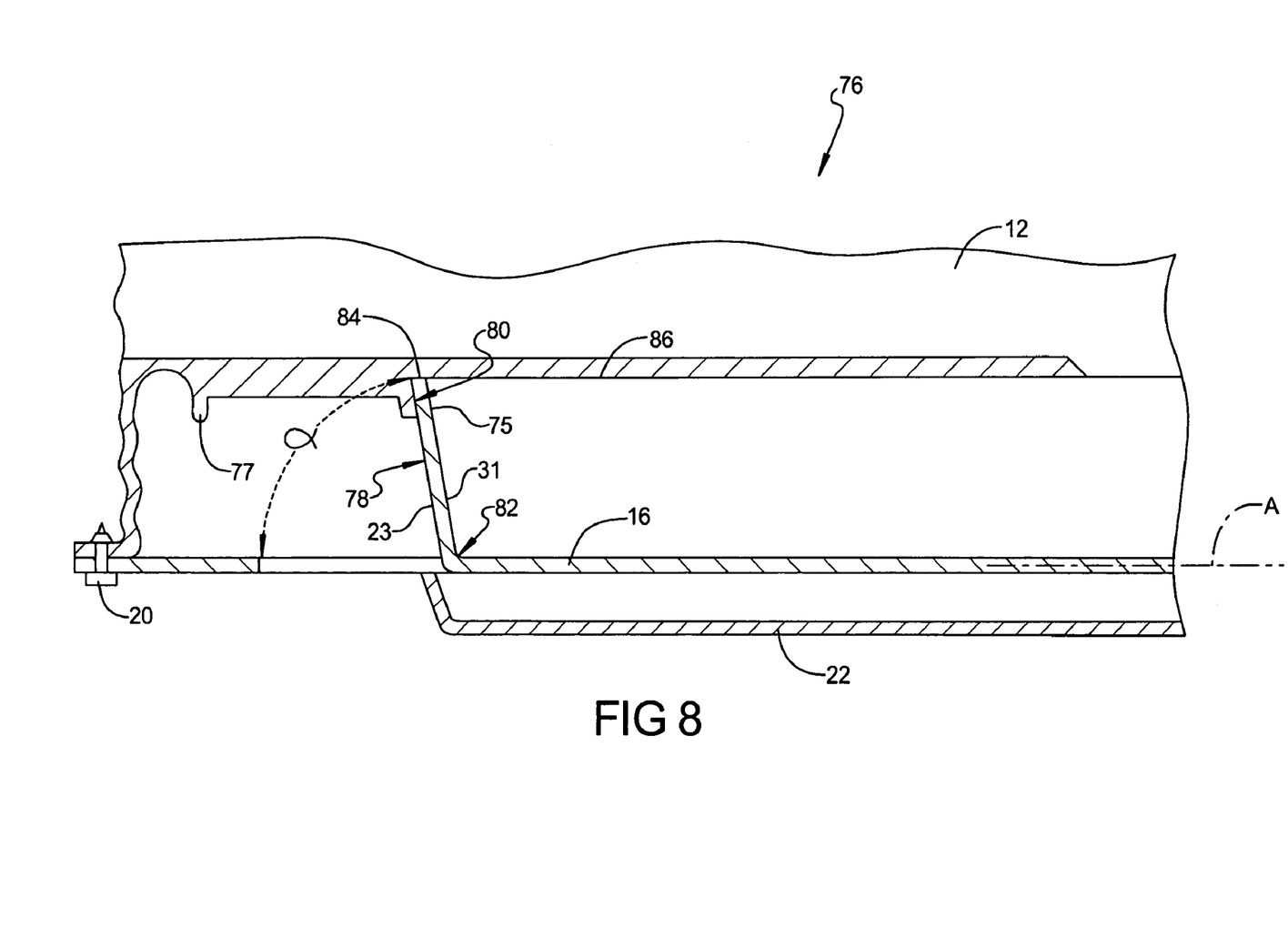
FIG. 8 is a partial cross-sectional assembly view of the assembled shield and trim panel components of FIG. 1.

Referring now generally to FIGS. 1 and 8, the deployment and use of an exemplary bend flap 75 is demonstrated. The following discussion is therefore applicable to installation and use of bend flaps of the present invention in general. In an assembly 76, shield 10 is first aligned with and connected to trim panel 12 using fasteners 20. As shield 10 is connected to trim panel 12, bend flap 75 is bent or deployed. In the example shown in FIG. 8, bend flap 75 is bent past an extending member 77 positioned in trim panel 12 to accommodate, for example, a speaker. An angle of bending a of bend flap 75 is preferably 90 degrees relative to planar axis "A" of shield 10. However, angle of bending a can vary from approximately 20 degrees up to 90 degrees, measurable from either first side 23 or second side 31 relative to bend flap 75, depending on the application. Angle of bending a aligns a face 78 of bend flap 75 with an outer face 80 of the extending member 77. In other embodiments of the invention, extending member 77 may be created for a window motor housing, a door handle, or the like. After bending at a bend axis 82, a distal edge 84 of bend flap 75 is directed toward and contacts an outer face 86 of trim panel 12.

Figure 9:
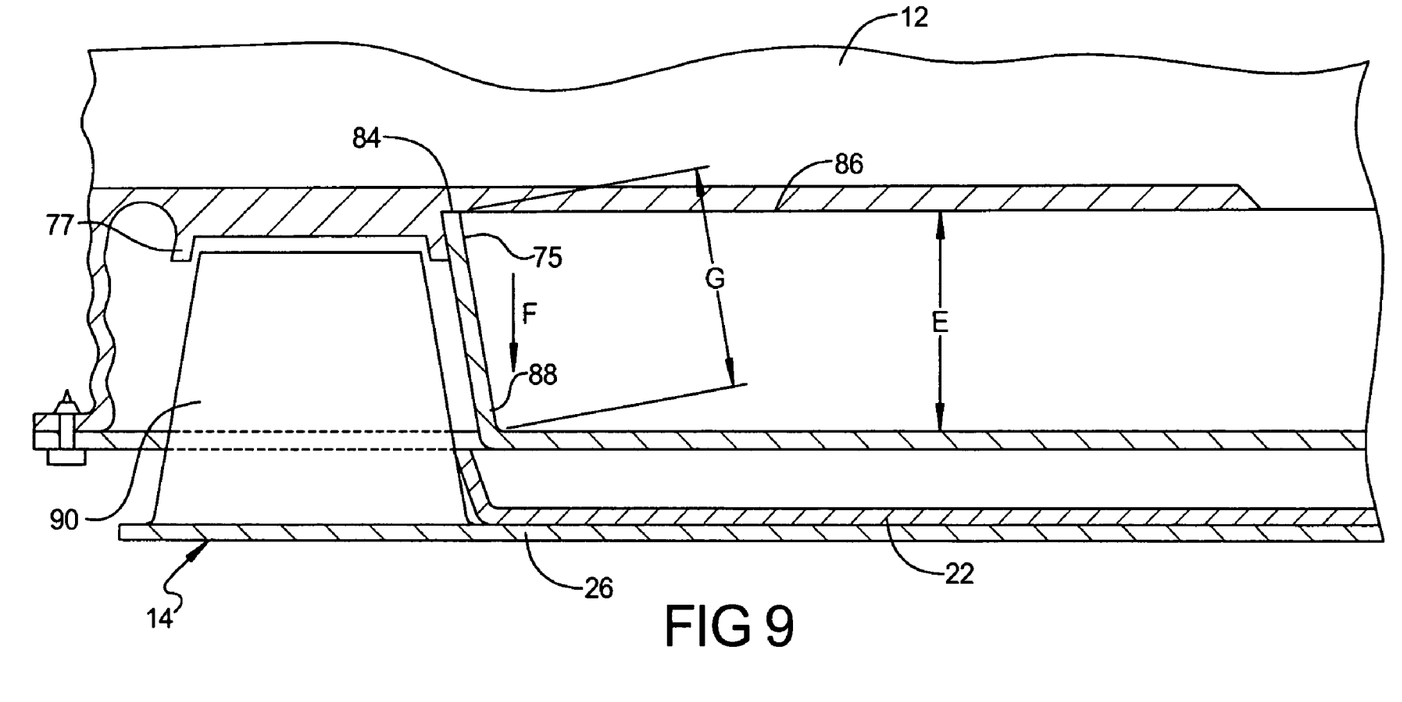
FIG. 9 is a partial cross-sectional assembly view similar to FIG. 8 further showing the door member of FIG. 1 connected to the assembly of FIG. 8.

As best seen in reference to FIG. 9, as trim panel 12 is engaged with door member 14, bend flap 75 which is engaged with the relatively stiffer trim panel 12 transfers a stiffening force "F" from trim panel 12 through distal edge 84 and a body 88 of bend flap 75 to locally stiffen body 16 proximate to raised rib 22 for example local to a speaker 90. This local stiffening effect is particularly desirable where the air/moisture seal is created between shield 10 and door member 14. Lofting material normally used or added to generate or enhance this local stiffening effect can therefore be reduced or eliminated proximate to bend flap 75.

Referring again to FIGS. 3, 6 and 9, lofting 66 is provided as a polymeric fiber material. Lofting 66 is attached to vehicle water shields, for example, by an adhesive to improve acoustic attenuation and/or to assist in locally stiffening the water shield to maximize the formation of the seal to the door member 14. Thickness "D" of lofting 66 commonly ranges up to approximately 25 mm. Bend flaps of the present invention are therefore particularly useful to promote formation of the seal for shield 10 in applications where a standoff distance "E" between shield 10 and trim panel 12 is greater than the thickness "D" of lofting 66 or if no lofting material is present. A total bend flap length "G" of the present invention can therefore vary depending on the standoff distance "E". In one exemplary embodiment of the invention, bend flaps having a total bend flap length "G" variable between approximately 25 mm and approximately 7.6 cm provide an effective seal of shield 10 to door member 14 when the total body thickness "C" is approximately 4 mm. It should be noted that these dimensions do not limit the invention, but are provided for example only.

Bend flaps for trim panel mounted water shields of the present invention provide several advantages. For applications where raised forms are impractical, one or more bend flaps of the present invention can locally stiffen the water shield and promote formation of a water resistant seal to a vehicle body member. Bend flaps of the present invention are also applicable when local thickness of a lofting material is insufficient to locally stiffen the water shield. By extending the bend flaps from material of the water shield, additional lofting material or spacer members to stiffen the water shield can be eliminated. The shape and length of bend flaps of the present invention can also be predetermined for each application to maximize localized water shield seal formation while reducing installation time and cost. If the door assembly is subsequently disassembled the bend flaps of the present invention are reusable and are retained with the water shield, reducing lost parts and re-assembly costs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle sound and moisture barrier, comprising:
a barrier body;
a raised rib operably extending from a first side of the barrier body;
a bend flap positioned proximate to the raised rib having a bend flap body initially defining a common plane with the barrier body; and
a bend axis created at a junction line between the bend flap and the barrier body, the bend axis operable to permit bending the bend flap toward a second side of the barrier body and opposite to the raised rib;
wherein a distal end of the bend flap following bending defines a contact surface operable to transfer a stiffening force from the distal end through the bend flap body to the raised rib.

2. The barrier of claim 1, wherein the barrier body comprises a polymeric material.

3. The barrier of claim 2, further comprising a lofting material disposed on the second side outside of an area defined by the bend flap.

4. The barrier of claim 1, further comprising an adhesive bead applied to the raised rib.

5. The barrier of claim 1, wherein the bend axis comprises a dimpling.

6. The barrier of claim 1, wherein the bend flap body further comprises first, second and third free sides, the bend flap body being integrally connected to the barrier body only along the bend axis.

7. The barrier of claim 1, wherein the bend flap following bending along the bend axis defines a bend angle with respect to the barrier body.

8. The barrier of claim 1, wherein the bend flap is positioned entirely within an outer perimeter of the barrier body.

9. The barrier of claim 1, wherein the bend axis defines an integral attachment between the bend flap and an outer perimeter of the barrier body, the bend flap extending outwardly from the outer perimeter.

10. The barrier of claim 1, further comprising a raised form positioned adjacent to a portion of the raised rib and extending from the second side of the barrier body and opposite to the first rib.

11. A vehicle sound and moisture barrier, comprising:
a barrier body;
a raised rib extending from a first side of the barrier body; and
a raised form positioned proximate to the raised rib and extending from a second side of the barrier opposite to the first side;
a bend flap integrally joined to the barrier body and positioned proximate to the raised rib, the bend flap having a bend flap body initially defining a common plane with the barrier body; and
a bending junction created at a junction line between the bend flap and the barrier body, the bending junction defining a bend axis operable to permit bending the bend flap toward the second side of the barrier body and opposite to the raised rib;
wherein a distal end of the bend flap following bending along the bending junction defines a contact surface operable to transfer a stiffening force from the distal end through the bend flap body to the raised rib.

12. The barrier of claim 11, wherein the bend flap further comprises a partially free perimeter separated from the barrier body.

13. The barrier of claim 12, wherein the bend flap further comprises a substantially rectangular shape having the bending junction created along a first side integrally connected to the barrier body, the partially free perimeter defining a remainder of sides of the rectangular shape.

14. The barrier of claim 12, wherein the bending junction defines an integrally connected portion of the bend flap, the partially free perimeter extending outwardly from an outer perimeter of the barrier body.

15. The barrier of claim 12, wherein the bending junction defines an integrally connected portion of the bend flap, the partially free perimeter positioned entirely within an outer perimeter of the barrier body.

16. The barrier of claim 12, wherein the bending junction defines an integrally connected portion of the bend flap, the partially free perimeter defining a portion of an outer perimeter of the barrier body.

17. The barrier of claim 11, wherein the bend flap further defines one of a rectangular, an oval, a partially circular and a triangular shape.

18. The barrier of claim 11, wherein the bending junction comprises a dimpling created on the second side of the barrier body.

19. A barrier disposable between a vehicle door panel and a trim panel, comprising:
a barrier body;
a raised rib operably extending from a first side of the barrier body and oriented toward the door panel;
a bend flap positioned proximate to the raised rib having a bend flap body initially defining a common plane with the barrier body; and
a bending junction created at a junction line between the bend flap and the barrier body, the bending junction defining a bend axis operable to permit bending the bend flap toward a second side of the barrier body and opposite to the raised rib;
wherein a distal end of the bend flap following bending includes a contact surface operable to contact the trim panel and transfer a stiffening force from the trim panel through the bend flap body to the raised rib to promote contact between the raised rib and the door panel.

20. The barrier of claim 19, wherein the bend flap following bending along the bend axis defines a bend angle with respect to the barrier body.

21. The barrier of claim 20, wherein the bend angle includes an angle operably ranging from approximately 20 degrees to approximately 90 degrees, the angle measurable from one of the first and second sides of the barrier body.

22. The barrier of claim 20, wherein the door panel comprises an extending member, the bend angle of the bend flap resulting from abutment of the bend flap body in contact with the extending member.

* * * * *

UNITED STATES PATENT AND TRADEMARK OFFICE
CERTIFICATE OF CORRECTION

| | | |
|---|---|---|
| PATENT NO. | : 7,240,956 B2 | Page 1 of 1 |
| APPLICATION NO. | : 11/199420 | |
| DATED | : July 10, 2007 | |
| INVENTOR(S) | : Andrew DeWolfe and Jack L. Gray | |

It is certified that error appears in the above-identified patent and that said Letters Patent is hereby corrected as shown below:

Column 4, Line 61: "Reference" should be --reference--

Column 6, Line 7, 2$^{nd}$ occurrence: After "bending", "a" should be --$\alpha$--

Column 6, Line 9: After "bending", "a" should be --$\alpha$--

Column 6, Line 12: After "bending", "a" should be --$\alpha$--

Signed and Sealed this

Sixth Day of November, 2007

JON W. DUDAS
*Director of the United States Patent and Trademark Office*